Dec. 10, 1963 R. E. WHIPPLE 3,114,081
IMPULSE GENERATOR FOR DEMAND METERING
Filed April 17, 1961 2 Sheets-Sheet 1

Inventor,
Richard E. Whipple
by Francis K. Doyle
His Attorney.

Dec. 10, 1963   R. E. WHIPPLE   3,114,081
IMPULSE GENERATOR FOR DEMAND METERING
Filed April 17, 1961   2 Sheets-Sheet 2

Inventor,
Richard E. Whipple,
by Francis X. Doyle
His Attorney.

3,114,081
IMPULSE GENERATOR FOR DEMAND METERING
Richard E. Whipple, Rochester, N.H., assignor to General Electric Company, a corporation of New York
Filed Apr. 17, 1961, Ser. No. 103,608
5 Claims. (Cl. 317—124)

This invention relates to the art of demand metering and more particularly to an impulse generator for demand metering.

As is well known to those skilled in the metering art, the concept of demand is associated with the metering of electrical energy. It has been derived in an effort to equitably recover the capital cost of equipment. Electrical generating and distributing equipment, which is installed by utilities, must be capable of handling the peak loads which may occur from the total requirements of the utilities' customers. However, such equipment in general, will have greater capacity than is normally required by the customer. To recover the cost of this equipment, various known demand devices measure the peaking effects of the individual customer installation by determining the peak of the real power required by the customer over specified time intervals. Those customers who have high peak demand during such time intervals, in comparison to their average load, are required to pay an added charge based upon this peak demand, as their share of the cost of the increased capacity required to be maintained by the utility. In the general field of the demand metering art, the demand devices are utilized to obtain quantitative information relative to time.

Demand meters are generally of two types, one of which is a direct driven device and the other being a contact or impulse operated device. In the direct driven device, the demand meter is generally mounted in the same case as the watthour meter and is directly driven from the watthour meter rotor or shaft. In the contact or impulse operated device, a contact or impulse means is provided in the watthour meter case and the demand meter is separated therefrom. The contact or impulse means is driven by the watthour meter shaft and produces electrical impulses as the watthour meter rotates. Each impulse represents a predetermined number of watthours according to the gear ratio of the contact means. These impulses are delivered to the demand meter where they are converted to a mechanical rotation. This invention is concerned with the contact means or impulse generator which generates the electrical impulses from the rotation of the watthour meter to drive the demand meter.

As noted above, the contact means or impulse generator serves as the electrical coupling between a watthour meter and a demand meter. A predetermined ratio gear train is directly driven by the watthour meter shaft. In prior art devices, this gear train was used to drive an output shaft provided with cams or commutator devices which operated contacts to complete the electrical circuit to the demand meter. As is well known, watthour meters are essentially low torque devices. Thus it is required that the contact device for impulse generation not impose a substantial torque load on the watthour meter. As the demand for electrical energy has increased over the years, meters have been made more sensitive, thus producing lower torque per kilowatt. On the other hand, there has been a desire to obtain more and more impulses per interval because of the greater resolution provided to the demand meter by the number of impulses. This combination has increased the demand on the contact devices to the point where meter slow-down, coupled with light contact pressure and its resultant high maintenance problems, has limited the practical application of the known contact devices.

In many installations, such as power interchange points between two systems, current can flow either way depending upon which system needs the electrical energy. In these cases, the watthour meter may back up. However, if the meter is allowed to back up its registration will be reduced, but the demand reading, which is predicated upon the watthour meter rotation, will be increased. Thus the demand reading increases even though the power is being supplied to the system rather than being purchased therefrom. Further, meters are also subject to vibration, particularly in industrial locations where many such type demand meters are used. In those instances of extreme vibration to the watthour meter, false impulses are generated by many of the contact devices of the prior art. In order to overcome these shortcomings, some means of preventing back up of the impulse generating device must be provided as well as a means to prevent vibration from generating false impulses from the impulse generator.

It is therefore an object of this invention to provide an impulse generating device for a watthour meter that will not substantially increase the torque load on such meter.

Another object of this invention is to provide an impulse generator for a watthour meter which will not depend upon contact pressure for the actuation of the impulse generator.

A further object of this invention is to provide an impulse generator for a watthour meter that will require little maintenance while in operation.

A still further object of this invention is to provide an impulse generator for a watthour meter that will provide higher impulses per meter shaft revolution while having increased life over prior art devices.

A further object of this invention is to provide an impulse generating device for watthour meters which will substantially eliminate any false impulses being generated by such impulse generator due either to meter reversal or meter vibration.

In carrying out this invention in form, a contactless impulse generator is provided operated by the meter rotor of a watthour meter. The impulse generator comprises a gear train of predetermined ratio adapted to be driven by the rotor of a watthour meter. A shutter means is provided driven by such gear train and having a series of openings therein. A light source is mounted on one side of the shutter while a photoelectric cell is mounted on the opposite side. As the shutter is rotated between the light and the photoelectric cell, varying areas of light are impressed on such cell. The resistance of the photocell varies inversely with the light shining thereon and thus, with a potential impressed across the cell, provides a current flow through such cell which will fluctuate in accordance with the light falling on the cell. Since the area of light impressed on the photocell varies in accordance with the rotation of the shutter, the photocell will provide current impulses, fluctuating according to the predetermined ratio of kilowatt-hours.

While the subject matter which is regarded as the invention herein will be pointed out and distinctly claimed in the claims appended hereto, it is believed that this invention and the manner in which its various objects are obtained, as well as other objects and advantages thereof, will be better understood from the following description when taken in connection with the accompanying drawings, in which:

Figure 1:
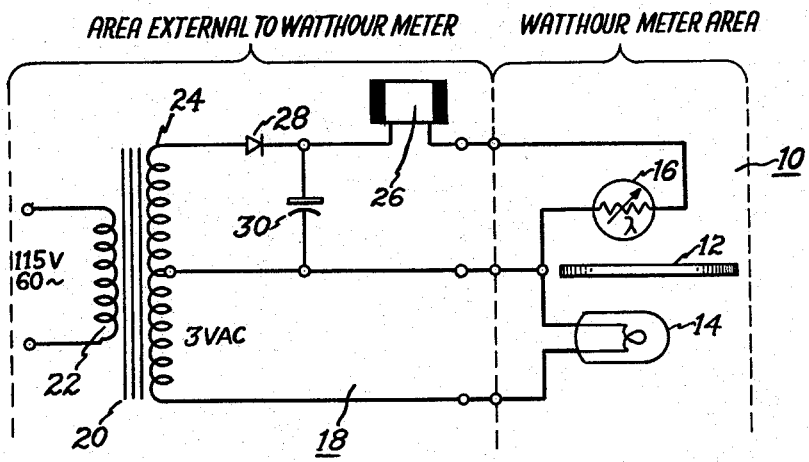
FIGURE 1 is a schematic wiring diagram of one form of the impulse generating device of this invention with its associated amplifier circuit.

Referring now to the drawings, wherein like numerals are used to indicate like parts throughout, there is shown a contactless impulse generator 10 which is adapted to be mounted on a watthour meter (not shown). The contactless impulse generator 10 generally comprises a shutter disc 12 having a light source 14 mounted on one side thereof and a photoelectric cell 16 mounted on the other side. As the shutter 12 is caused to be revolved by the rotor of the watthour meter, varying areas of light from the light source 14 will fall on the photocell 16, thus varying the resistance of the photocell in a well known manner. By applying an electrical potential to the photocell 16, the current through the photocell will very inversely as its resistance and will thus provide current impulses which fluctuate according to the rotation of the shutter disc 12.

Referring now in particular to FIGURE 1 of the drawing, there is shown the schematic wiring diagram of the impulse generating device 10 as well as the associated amplifier circuit 18. As indicated in FIGURE 1, the impulse generator 10 is mounted in the watthour meter while the amplifier circuit 18 is mounted externally to the watthour meter. Considering first the amplifier 18, it comprises a transformer device 20 having a primary coil 22 which is attached to a source of alternating current. A center tapped secondary 24 is provided which substantially reduces the voltage from the primary coil 22 and is used to activate the light source 14 as well as provide the desired potential across the photocell 16. A relay coil 26 is provided in the amplifier 18 and is effectively mounted in series circuit relationship with the photocell 16, as indicated in FIGURE 1. The relay 26 is preferably a D.C. voltage relay and therefore, diode 28 and capacitor 30 are connected in circuit with the relay coil 26 to convert the A.C. voltage to D.C. voltage. As the resistance of the photocell 16 varies due to the amount of light impinging thereon, the current through the relay coil 26 will fluctuate in accordance with this resistance but in an inverse manner and will thus be utilized to pick up and drop out the contacts (not shown) of the relay 26 to provide the desired impulses to the demand meter (not shown).

Figure 2:
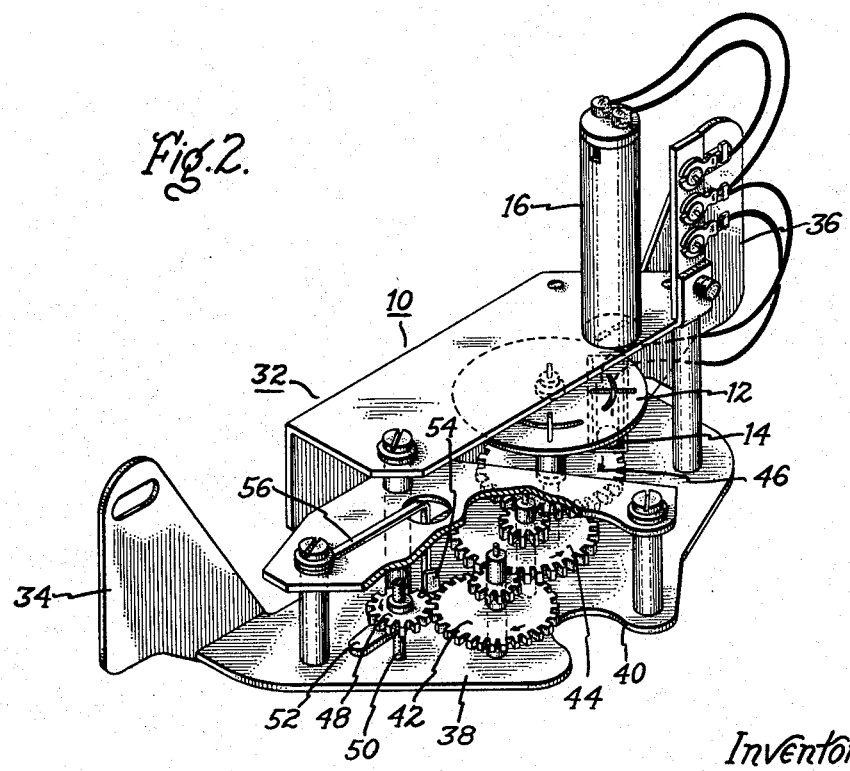
FIGURE 2 is a perspective view of one form of the impulse generating device of this invention.
Figure 3:
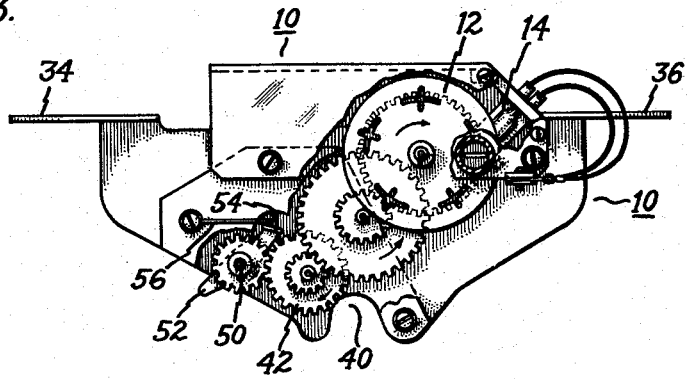
FIGURE 3 is a top view of the impulse generator shown in FIGURE 2.
Figure 4:
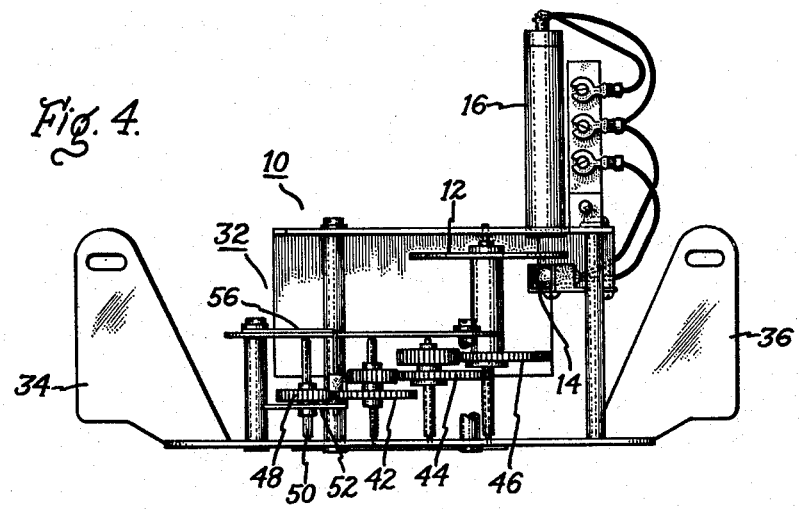
FIGURE 4 is a side view of the impulse generator shown in FIGURE 2.

Referring now to FIGURES 2, 3, and 4 of the drawing for a more detailed description of the contactless impulse generator of this invention, the contactless impulse generator 10 is shown as comprising a U shaped support member generally indicated by the numeral 32 and is provided with two side flanges 34 and 36 by which it may be mounted on a watthour meter in a well known manner. The bottom plate 38 of the support member 32 is provided with an opening 40 through which the rotor or shaft of the watthour meter may be inserted. As is well known to those skilled in the art, the rotor of the watthour meter has a spur gear that will drive gear 42 of the gear train and, through the meshing gears 44 and 46, will cause rotation of the shutter disc 12 in a predetermined ratio to the rotation of the watthour meter rotor. As is well understood, the ratio obtained will be determined by the ratio of the various gears 42, 44, and 46 of the gear train.

In order to prevent a reversal of the watthour meter from causing false impulses to be generated by the contactless impulse generator of this invention, a detent gear 48 is provided which is driven by the gear 42. Mounted on the shaft 50 of the detent gear 48 is a detent mechanism 52, being provided with a dog member 54. Detent mechanism 52 is loosely coupled with the detent shaft 50 by friction between the shaft 50 and the detent mechanism 52. As the driving gear 42 rotates in the direction shown by the arrow, the detent gear 48 will rotate in the opposite direction, indicated by the arrow, and will thus be rotated in a manner to drive the dog 54 away from the driving gear 42. In order to prevent the complete rotation of dog 54, a detent stop device 56 is provided extending through an opening in the top of the mounting plate and into contact with the dog 54. As will be apparent, should the meter reverse, thereby reversing the direction of rotation of gear 42, gear 48 will also be rotated in a reverse direction so as to drive the dog member 54 via the friction between shaft 50 and detent mechanism 52 into the teeth of the gear 42. The dog member 54 will thus prevent the backward rotation of the driving gear 42 and thus will prevent the shutter disc 12 from being rotated in a reverse direction to generate false impulses to the watthour demand meter.

Mounted on the side of support member 32 is the light source 14, as more clearly shown in FIGURE 3 of the drawing. As can be seen, the light source 14 is mounted directly below the shutter disc while the photocell 16 is mounted on the top of the U shaped support member 32 directly above the light source 14 and also above the shutter disc 12. Therefore, as shutter disc 12 rotates, the slots in the shutter disc provide for varying areas of light from the light source to fall upon the photocell, thereby varying its resistance in a well known manner.

Figure 5:
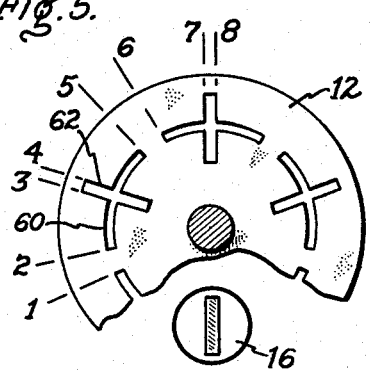
FIGURE 5 is a bottom view of one form of a shutter device used in the impulse generator of this invention with a portion broken away to show the photocell used in conjunction therewith.

Referring now specifically to FIGURE 5 of the drawing, the shutter disc 12 is shown in bottom view to more clearly show the openings which are provided in such shutter disc. As can be seen from FIGURE 5 of the drawing, the shutter disc 12 is provided with openings in the form of a cross with a portion of the shutter disc being solid between each of the cross-shaped slots. For example, as shown in FIGURE 5, between the points 1 and 2 on the shutter disc 12 the area is solid and no light will be seen from the light source 14 by the photocell 16. However, as the disc rotates between the points 2 and 3, a portion of the light from light source 14 will shine through the narrow slot 60, thereby decreasing the resistance of the light cell 16. As the shutter disc rotates until the slot 62, between the points 3 and 4, is directly between the light source and the photocell, the greatest amount of light will shine on the photocell. Therefore, the resistance of the photocell will be at its lowest point. Thus, it will be apparent that, as the shutter disc 12 rotates in accordance with the rotation of the watthour meter (not shown) varying areas of light will be caused to shine upon the photocell 16 from the light source 14. Because of this, the current flowing through the photocell will vary in an inverse manner, since the resistance of the photocell varies inversely with the amount of light shining on the photocell.

Figure 6:
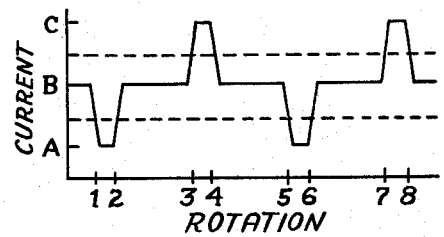
FIGURE 6 is a plot of the current through the photoelectric cell during the revolution of the shutter disc.

The flow of current through the photocell 16 is more clearly set forth in FIGURE 6 of the drawing. In FIGURE 6 of the drawing it can be seen that the current flow through the photocell 16 varies from a low value indicated at A in the diagram to a high value indicated at C in the diagram. Along the horizontal line of the chart are indicated the various points of the disc which provides the varying intensities of current through the photocell 16. As shown, when the portions 1, 2 of the shutter are between the photocell 16 and the light source 14, no light will shine upon the photocell and, therefore, its resistance will be at its highest point. Thus the current flowing through the photocell will be at the lowest point, indicated as A. However, as the shutter rotates between points 2 and 3 the intensity of the light increases rapidly to the median point, caused by the slot 60 of the shutter disc. At this point, the resistance of the photocell is at an intermediate value. Therefore, the current flow through the photocell 16 is at an intermediate value, indicated at B in the diagram of FIGURE 6. As disc member 12 continues to rotate to the area indicated by the points 3 and 4 of the disc, that is, when slot 62 is directly between the light source 14 and the photocell 16, the greatest amount of light will shine upon the photocell. At this point the resistance of the photocell will be least and the current flow therethrough will be at the highest point, indicated at C in the diagram of FIGURE 6.

Of course, as the shutter continues to rotate from points 4—5, the resistance of the photocell will again return to the median level. Therefore, the current flow therethrough will be at the median level B, as shown in the diagram. At points 5 and 6 of the shutter, the light will be the least. Therefore, the resistance of the photocell will be at its highest, and the current therethrough will drop to the lowest point A shown on the diagram. Obviously, this fluctuation of the current flow through the photocell 16 will be repeated as the shutter disc continues to rotate between the light source 14 and the photocell 16. In this manner, it can be seen that a fluctuating current is provided through the photocell 16 which corresponds to the rotation of the shutter disc 12 and, therefore, provides the desired impulse generation by the impulse generating device 10.

Of course, it will be obvious that the relay, in circuit with the photocell 16, can be adjusted such that it will drop out between the current levels indicated by points A and B and will pick up between the current levels indicated by points B and C. Therefore, the median current level B will be considered as a hold level. At this level, should the relay be dropped out it will not pick up during the time the current level is maintained at intermediate level B. On the other hand, should the relay be picked up it, of course, will not drop out during the holding of the current at the median level B. Thus it can be seen, as indicated by the dotted line in FIGURE 6, that a deadband is provided by means of this device during which an impulse will not be generated. Should the meter attempt to reverse after either the pick up or drop out of the relay, the dog member 54 will contact the driving gear 42, within this deadband area, and hold such gear stationary. This will prevent the rotation of the shutter disc 12, thus preventing the current through the photocell 16 from being changed beyond its median hold position. Therefore, no false impulses will be generated. Of course, it will be clear, inasmuch as the contactless impulse device of this invention is not provided with any contacts, that extreme vibration of the watthour meter to which it is attached will not cause the generation of any false impulses. Further, any vibration which would tend to reverse the rotation of the shutter disc will also be stopped by the detent mechanism 52 before a false impulse can be generated.

It will be clear from the above description that an impulse generating device having a desired long life, and maintenance free, has been obtained by the device of this invention. As will be apparent, there are no contacts or commutators in the impulse generator and therefore, no requirement for a high degree of maintenance. The light source 14, and the photocell 16 may be readily removed and replaced, if desired, without involving any unusual problems since each is readily removable from the support member 32. Further, the light source 14 and the photocell 16 will have a desirable long life between the periods where it would be necessary to replace either of these devices. Thus there has been hereinbefore set forth an impulse generating device applicable to demand metering of the contact-operated type which will provide long life, high accuracy, and maintenance free service. While there has been shown and described the present preferred embodiment of the contactless impulse generating device of this invention, it will be well understood by those skilled in the art, that various changes and modifications may be made in this embodiment. It is, therefore, to be understood that the description hereinbefore set forth is for purposes of illustration only and should not be considered a limitation on the invention. Changes may be made within the spirit and scope of the invention as set forth in the appended claims.

What is claimed as new and which it is desired to secure by Leters Patent of the United States is:

1. An impulse generating device for a watthour meter comprising; a support structure adapted to be mounted on a watthour meter, a gear train mounted in said support structure, said gear train adapted to be driven by the rotor of a watthour meter, a shutter disc rotatably mounted in said support structure, means interconnecting said shutter disc and said gear train to cause rotation of said shutter disc, a light source mounted in said support structure on one side of said shuter disc, a photoelectric cell mounted in said support structure on the other side of said shutter disc, spaced apertures provided in said shutter disc between said light source and said photoelectric cell, each of said spaced apertures comprising a slotted opening having a narrow portion and a wide portion in the direction of rotation of said disc, whereby as said shutter disc is rotated three areas of light are impressed upon said cell to thereby vary the resistance of said photoelectric cell whereby when an electric potential is impressed across said photoelectric cell and said shutter disc is rotated, a fluctuating electric current is caused to flow in said cell proportional to the rotation of said shutter disc.

2. An impulse generating device as claimed in claim 1 in which, a gear means is rotatably mounted in said support structure in contact with said gear train and a detent mechanism is connected to said gear means such that when said gear train is being driven in one direction, said detent mechanism is in one position and when said gear train is driven in the opposite direction said detent mechanism is driven into contact with said gear train to thereby prevent such movement of said gear train.

3. An impulse generating device as claimed in claim 1 in which said spaced apertures are each in the form of a cross, having a central opening substantially equal to the active area of said photo cell, with narrow slots on each side of said central opening which are substantially smaller than the active area of the photo cell, with solid areas of said disc separating each of said cross-shaped apertures.

4. An impulse generating device as claimed in claim 2 in which said spaced apertures are each in the form of a cross, having a central opening substantially equal to the active area of said photo cell, with narrow slots on each side of said central opening which are substantially smaller than the active area of the photo cell, with solid areas of said disc separating each of said cross-shaped apertures.

5. An impulse generating device as claimed in claim 4 in which a relay coil is electrically connected in series with said photo cell, said relay having a pickup current substantially equal to the current flow in said photo cell when said central opening of said cross-shaped aperture is between said light source and said photo cell, said relay having a dropout current substantially equal to the current flow in said photo cell when one of said solid areas of said disc is between said light source and said photo cell, said relay not changing condition due to current flow in said photo cell when said narrow slots are between said light source and said photo cell, said narrow slots thereby providing a deadband between pickup and dropout condition of said relay coil to prevent a change in condition in said relay coil when said gear train is driven in said opposite direction to allow said detent mechanism to operate to prevent such movement of said gear train without a change in condition of said relay coil.

References Cited in the file of this patent

UNITED STATES PATENTS

| | | |
|---|---|---|
| 1,958,651 | Willis | May 15, 1934 |
| 2,102,145 | Fallou | Dec. 14, 1937 |
| 2,451,971 | Oman | Oct. 19, 1948 |
| 2,492,011 | Smith | Dec. 20, 1949 |
| 2,958,016 | Cavagnaro | Oct. 25, 1960 |